UNITED STATES PATENT OFFICE.

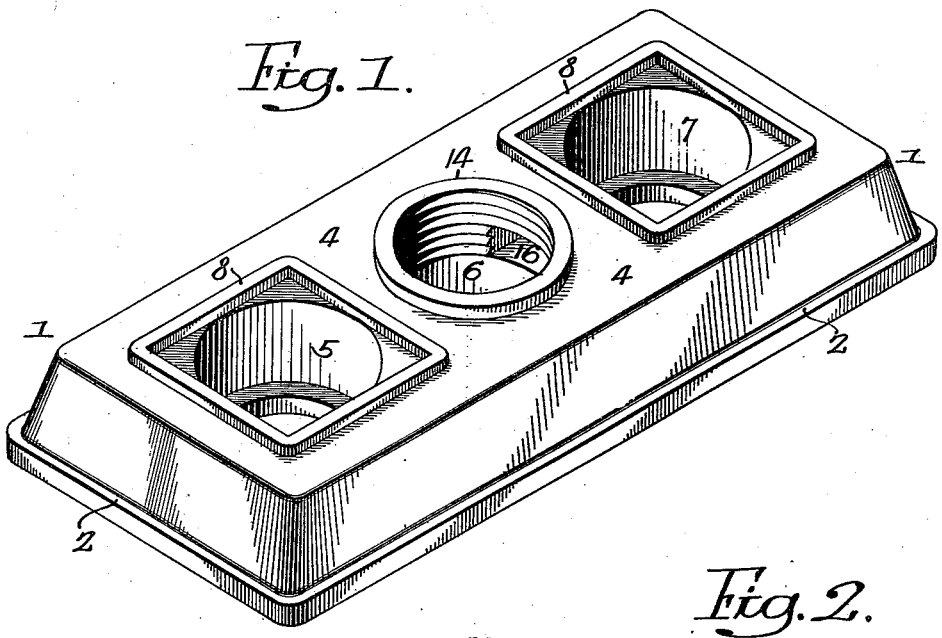
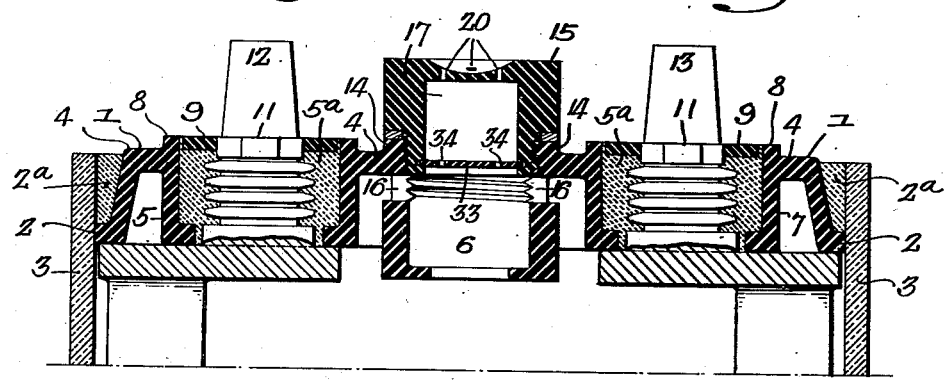
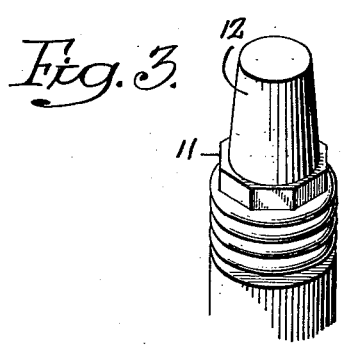
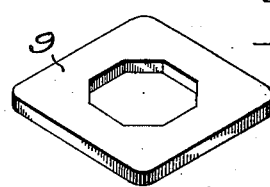

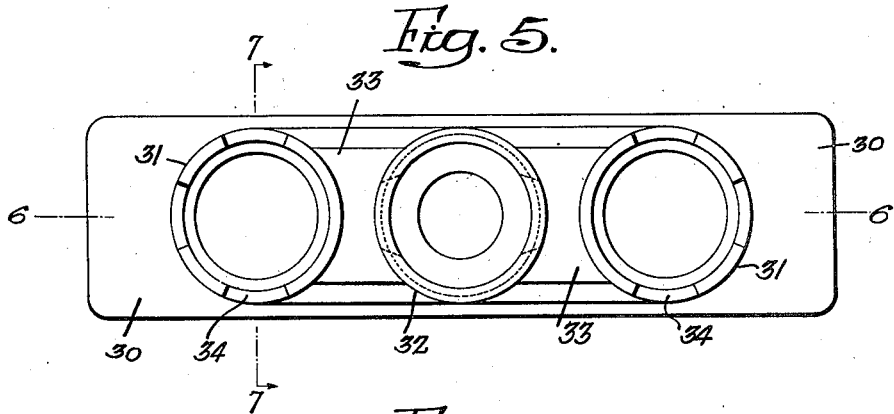
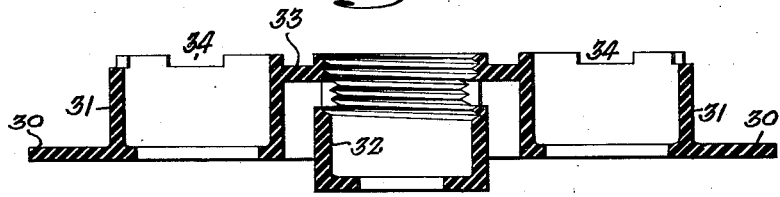
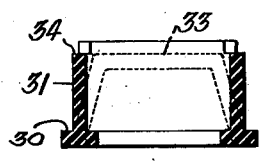
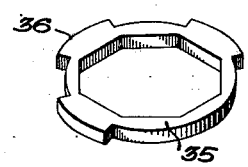

JAMES M. SKINNER AND STOCKTON H. MORTIMER, OF PHILADELPHIA, AND LAWRENCE J. PEARSON, OF WILLOW GROVE, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

STORAGE-BATTERY COVER.

1,402,673.  Specification of Letters Patent.  Patented Jan. 3, 1922.

Application filed October 6, 1916. Serial No. 124,097.

*To all whom it may concern:*

Be it known that we, JAMES M. SKINNER, STOCKTON H. MORTIMER, and LAWRENCE J. PEARSON, citizens of the United States; we, the said JAMES M. SKINNER and STOCKTON H. MORTIMER, being residents of the city and county of Philadelphia, Pennsylvania, and I, LAWRENCE J. PEARSON, being a resident of Willow Grove, Montgomery County, Pennsylvania, have invented a Storage-Battery Cover, of which the following is a specification.

One object of our invention is to provide a cover for a storage battery cell which shall include novel means for holding and insulating the cell terminals as well as a novel construction and arrangement of parts for preventing the escape as by splashing, of the electrolyte from the cell, while permitting the free outlet of any gases generated within the cell.

It is further desired to provide a storage battery cover with a relatively simple, substantial and inexpensive arrangement of parts which shall include a novel construction of separable socket and plug for allowing the convenient introduction of liquid and at the same time permitting the escape of air;—said construction also permitting the venting of the gases generated during use of the battery while preventing splashing of the liquid from the cell.

We also desire to provide a cell cover of such construction that any liquid which may be spilled on the top thereof is effectually prevented from attacking the cell terminals or from grounding or short circuiting them.

The invention also contemplates the provision of a cell cover with novel means for bracing and preventing the twisting or bending of, the cell terminals by reason of stresses exerted upon the conductors attached thereto.

These objects and other advantageous ends we secure as hereinafter set forth, reference being had to the accompanying drawings, in which, Fig. 1 is a perspective view of a storage battery cover constructed according to our invention;

Fig. 2 is a longitudinal vertical section of the cover shown in Fig. 1, showing it with the battery terminals in place;

Figs. 3 and 4 are perspective views of one of the cell terminals and of its cooperating washer respectively;

Fig. 5 is a plan of a slightly modified form of battery cell cover embodying our invention;

Figs. 6 and 7 are vertical sections taken respectively on the lines 6—6 and 7—7, Fig. 5; and Fig. 8 is a perspective view of the terminal holding washer used in that form of cell cover shown in Figs. 5, 6 and 7.

In the above drawings, 1 represents a molded or pressed casting of hard rubber or other suitable insulating and acid resistant material in the form of a shallow box-like structure designed to be used in an inverted position and having a peripheral flange 2 designed to closely fit against the interior walls of a storage battery cell indicated at 3. The sides of this cover structure are upwardly inclined from the flange 2 and with said cell walls provide an upwardly flaring annular recess of rectangular outline for the reception of sealing material $2^a$.

Projecting downwardly within the interior of the box-like structure from the plate 4 which forms the top thereof are three integral sleeves 5, 6 and 7, of which the first and last are inwardly flanged at their lower ends. These latter sleeves 5 and 7 are similar and upon the upper surface of the plate 4 their open ends are circumscribed by rectangular flanges 8 projecting above the surface of the top 4. Within the recesses or openings defined by these flanges are mounted rectangular washers 9 which in turn are provided with polygonal openings fitting correspondingly formed polygonal portions 11 on the terminal posts 12 and 13 respectively.

As shown in Fig. 2, said posts are of such diameter that they pass more or less closely through the flanged opening in the lower ends of the sleeves and have their polygonal portions 11 at or slightly below the level of the tops of the flanges 8. When the cover has been placed in position in the battery cell with the terminal posts 12 and 13 passing through the sleeves 5 and 7, the latter are filled with molten sealing material $5^a$ and have the washers 9 imbedded in or engaged by said material so that they are rigidly held in place within the rectangular spaces defined by said flanges. As a consequence said posts are likewise rigidly held and securely braced to the cover so that they are enabled to successfully resist any tendency to break or bend by reason of stresses exerted upon their projecting ends or on the conductors attached thereto.

The sleeve 6 (which may on occasion be left out entirely or shortened without departing from my invention) is between the sleeves 5 and 7 and in addition to having in some cases, such as that illustrated, an inwardly extending flange at its lower end, has an annular extension 14 projecting above the top surface of the plate 4. The upper portion of said sleeve has interior threads for the reception of a vent plug 15 and there are below it any suitable number of gas passages 16 opening into said portion from the highest parts of the space within the casting 1. Said plug 15 consists of a hollow body 17 having a vertically ribbed head and externally threaded at its lower end to fit the threads of the socket. The upper closed end of the body may be convex in form or recessed as shown, and has openings 20 from this recess into its interior. Its lower end is open but is formed with an annular interior recess in which is loosely mounted a thin perforated circular plate 33 of hard rubber of other suitable material;— the arrangement being such that while any gas formed in the cell may freely escape through the openings 34 in said plate and those (20) in the top, the escape of liquid from said cell by splashing or excessive movement, is effectually prevented.

Under conditions of use, when it is desired to introduce liquid within the cell, the plug 15 is removed so that the central sleeve 6 serves as a funnel for the reception of said liquid or as a guide through which a filling device may be inserted, and the air escapes from the chamber formed by the inverted box-like cover through the vent holes 16. When the desired amount of liquid has been introduced, the plug 15 is returned to the socket so that any gas tending to collect in the upper part of the cover may freely escape through the openings 16, 34 and 20.

The above described form of plug provides a space into which liquid from the interior of the battery may expand and through which any gas may freely escape from the interior of the cover through the perforations in the loose disk 33. From the above description it will be noted that we have provided a relatively simple form of cover which may be cast or molded with comparative ease and to which a suitable gas vent plug may be applied to prevent the splashing of liquid from the battery.

Obviously the shape and proportions of the battery cover may be widely varied without departing from our invention as may also the form of the terminal holding washer. For example, in Figs. 5 to 7 inclusive we have illustrated a battery cover especially designed for use in small cells and having a plane body portion 30 designed to fit closely into the cell container so as to bring the tops of the terminal and filling sleeves 31 and 32 in or adjacent the plane of the top of said container. The surface of the base plate 30 lying between the sleeves is raised as indicated at 33, to a level slightly below the tops of said sleeves and is sloped inwardly as indicated in Fig. 7.

In this case the top edges of the sleeves 31 each have a plurality of recesses 34 designed for the reception of lugs 36 which project from the terminal holding washer 35 in such manner that their ends are undercut. As in the case of the washer 9, the washers 35 have polygonal openings for the reception of the polygonal portion of the cell terminal, the depth of the recess 34 being substantially equal to the thickness of the washer so that when the latter are mounted in their sleeves, their top surfaces lie within the plane of the tops of the sleeves and in addition to covering the sealing material, serve to non-rotatably hold the battery terminals.

We claim:—

1. The combination of a cell cover having openings; sleeves mounted in the openings; terminals passing through said sleeves; fusible sealing material surrounding the terminals within the sleeves; and washers bracing the terminals to the cover to reinforce the former against torsional stresses.

2. The combination of a cell cover having openings; sleeves mounted in the openings; terminals passing through said sleeves; fusible sealing material surrounding the terminals within the sleeves; and means in addition to said sealing material for bracing said terminals to the cover against bending and torsional stresses.

3. The combination of a cell cover having terminal openings; sleeves mounted in said openings; terminals passing through the sleeves; and means connecting the terminals with the cover for reinforcing their upper ends against torsional stress.

4. The combination of a cell cover having openings; cell terminals passing through said openings and spaced away from the edges thereof; with means extending between the upper portions of the terminals and the adjacent portions of the cover for bracing the terminals against bending, said means being formed to prevent twisting of the terminals relatively to the cover.

5. The combination of a battery cover having openings; sleeves mounted in said openings and inwardly flanged at their lower ends; a flange extending around each of the openings at the top of the cover; terminals passing through said sleeves; insulating material mounted between each terminal and the adjacent portions of the sleeve; with washers mounted on the terminals and non-rotatably held by the top flanges of the cover respectively in positions to laterally brace the upper parts of the terminals and also reinforce them against torsional stress.

6. The combination of a battery cover having openings; flanges of other than circular outline extending around said openings respectively; terminals passing through the openings; means for laterally bracing the lower portions of the terminals from the cover; with washers formed to non-rotatably fit in the flanges and engaging the terminals to laterally brace the upper parts of the same while also reinforcing them against torsional stress.

7. The combination of a cell cover having a filling opening; a hollow plug removably mounted in said opening and having gas passages through its top; with a rigid perforated plate loosely mounted in an annular recess formed in the wall of its lower portion.

8. The combination of a cell cover having a filling opening; a hollow plug removably mounted in the cover for normally closing said opening; with means for permitting escape of gas through the plug while preventing escape of liquid, including a partition loosely mounted in the plug and provided with passages of relatively limited cross section.

9. The combination of a cell cover having a filling opening; a hollow plug removably mounted in the cover for normally closing said opening; and means for permitting escape of gas through the plug while preventing escape of liquid, consisting of a plurality of perforated partitions in the plug of which one is loosely mounted in an annular recess thereof.

10. A battery cell cover consisting of a downwardly flanged plate having a plurality of openings therein; sleeves respectively mounted in the openings of which two are positioned for the reception of terminal conductors; and a gas venting plug threaded into the sleeve of another opening, there being a passage into the plug-containing sleeve from the highest point of the space enclosed by the flange of the cover plate.

11. The combination of a battery cell cover having terminal openings; terminals passing through said openings and each including a portion of other than circular outline; with washers respectively fitting said portions of the terminals and non-rotatably held in the openings of the cover in positions to reinforce said terminals against torsional stress.

12. The combination of a battery cell cover having terminal openings; terminals passing through said openings and each including a portion of other than circular form; washers respectively fitting said portions of the terminals and non-rotatably held in the openings of the cover; inwardly flanged sleeves mounted in the openings; and sealing material surrounding each of the terminals within the spaces defined by the sleeves, the sleeve flanges and the washers.

JAMES M. SKINNER.
STOCKTON H. MORTIMER.
LAWRENCE J. PEARSON.